May 6, 1930.  L. F. MOODY  1,757,926
HYDRAULIC POWER PLANT
Original Filed May 26, 1920   2 Sheets-Sheet 1

May 6, 1930.  L. F. MOODY  1,757,926
HYDRAULIC POWER PLANT
Original Filed May 26, 1920  2 Sheets-Sheet 2
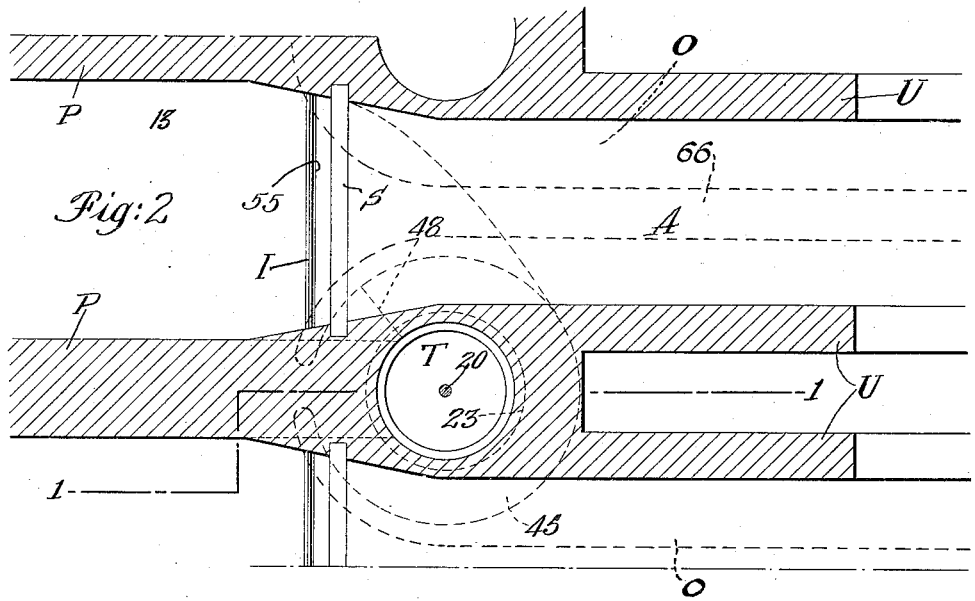
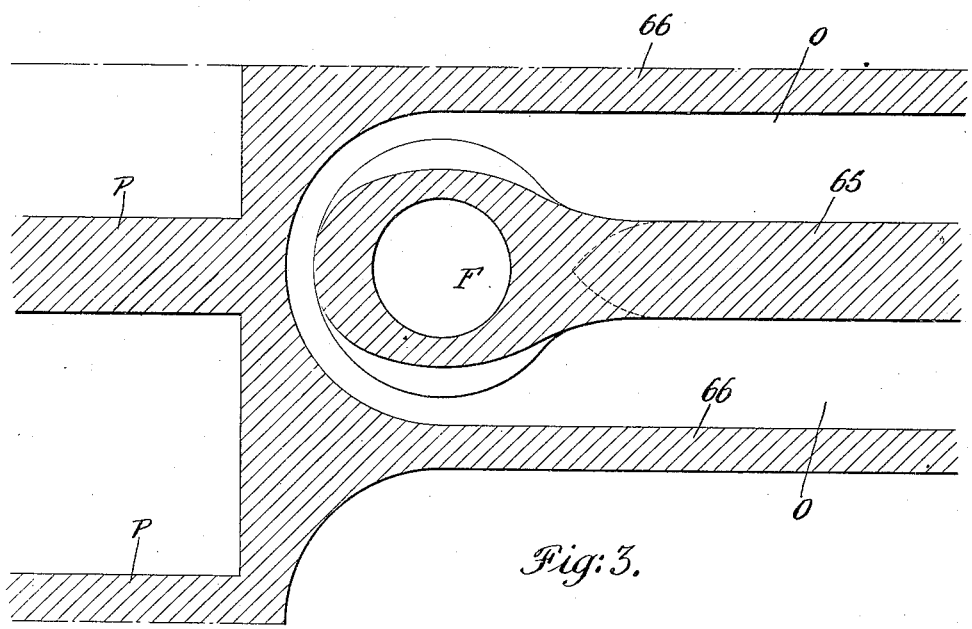
INVENTOR
Lewis F. Moody
BY
Edwards, Sager & Bauer
ATTORNEYS Patented May 6, 1930

1,757,926

UNITED STATES PATENT OFFICE

LEWIS FERRY MOODY, OF PHILADELPHIA, PENNSYLVANIA

HYDRAULIC-POWER PLANT

Original application filed May 26, 1920, Serial No. 384,402, and in Canada August 12, 1920. Divided and this application filed May 16, 1924. Serial No. 713,689. Renewed July 18, 1929.

This invention relates to hydraulic power plants and particularly to hydraulic turbine installations in connection with dams, for instance where the power house is built as a part of the dam.

The object of the invention is to provide a hydraulic turbine installation which will be strong and compact and efficient in the handling of the flow and adapted to form part of a dam and particularly of a dam subjected to abnormal high water or flood conditions requiring an overflow of the excess water past the power station.

In many power plants, particularly for low and medium heads, it becomes a serious problem to handle these abnormal flood conditions, for in addition to providing for the passage of the water which is to be utilized in the turbines there must be additional discharge means capable of handling in the majority of developments quantities of water greatly in excess of the quantity normally flowing in the stream and far beyond the discharge capacity of the turbine passages. The usual method of disposing of the excess water is the provision of long spillway sections in the dam over which the water can pass. In power developments in which the power house is built as a part of the dam, it often becomes difficult to provide a length of dam sufficient to furnish the necessary length of spillway in addition to the space required for the power house and in such cases it is particularly desirable to carry overflow or spillway passages through the portion of the dam occupied by the power house itself.

In the accompanying drawing illustrating a specific embodiment of the invention

Fig. 2 is a horizontal section of Fig. 1 on line 2, 2, and

Fig. 3 is a horizontal section of Fig. 1 on line 3, 3.

Figure 1:
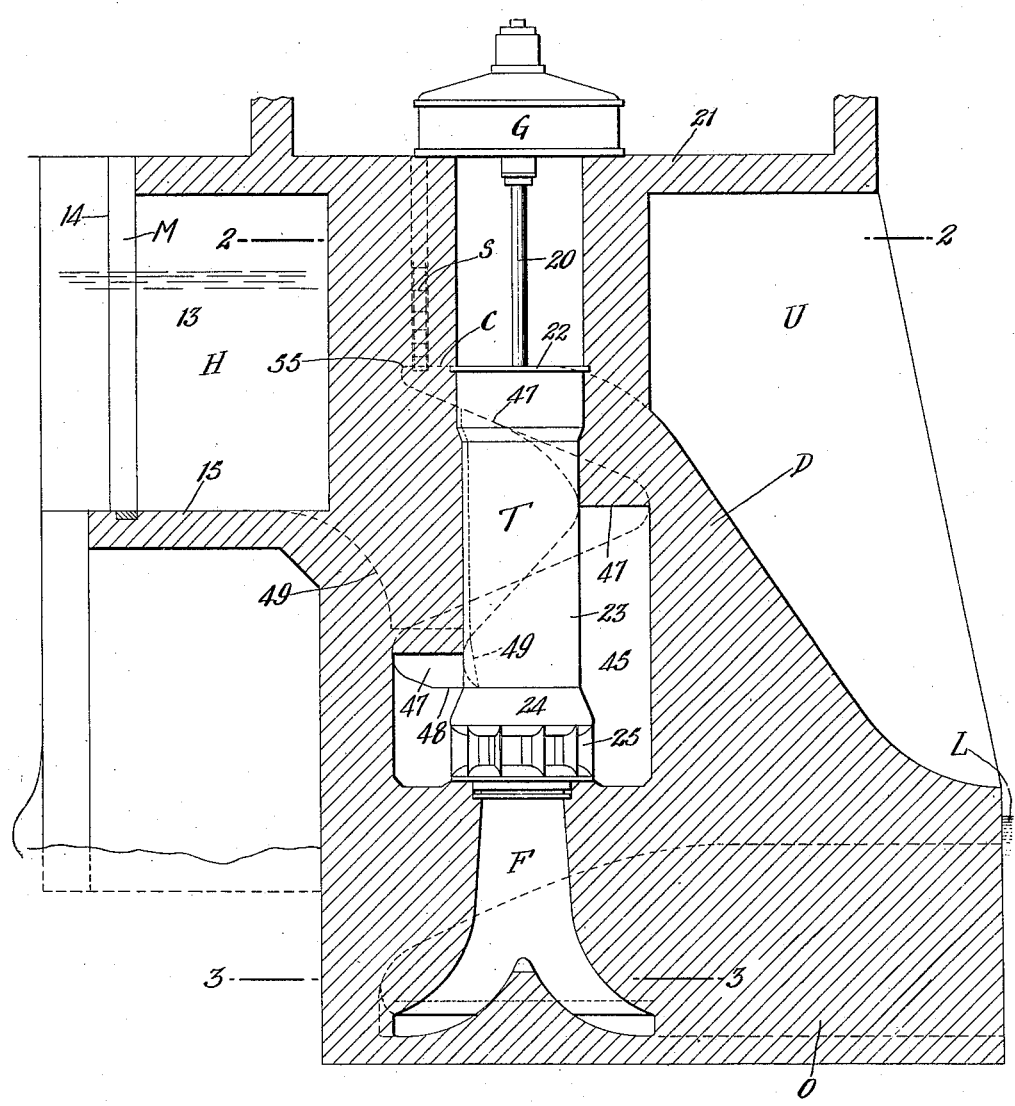
Fig. 1 is a vertical sectional view of a turbine installation taken in a direction at right angles to the general direction of the dam.

In the specific embodiment shown in the drawings a dam D has a crest C between the head water H and the tail water L and the head water face of the dam is extended backward by piers P between which are the flumes or passages 13 to the turbines and the spillway. The head gates M sliding in ways 14 of the piers P and seating against the floor 15 of the intake, control the flow to these passages 13. The auxiliary spillway gates S are provided above the dam crest C. The flow from the head water H passes through passage 13 to the intake passage I and around to and through the turbine runner and out through the draft tube F into the outlet passage O discharging into the tailwater L below the tail water level. The turbine runner has its shaft 20 extending upward above the crest of the dam to drive the generator G on the power house floor or generator deck 21.

The piers P support the generator floor 21 and are placed in line with the turbine axis with the spillways A thus located between the turbines and piers so that these piers may be extended outward beyond the inclined face of the dam D on the discharge side to form the buttresses U. The spillway crest C has its edge located at 55 just in advance of the spillway gate S and below this crest the intake passage I leads downward and sidewise on inclined spiral lines to a helical portion surrounding the turbine pit T and terminating in an edge 48 which is the edge formed where the top surface 47 of the intake meets the surface 49 which is a continuation of the lower surface of the intake. The edge 48 is terminated at the lower end of the cylindrical portion of the turbine pit T and above the conical casting 24 which rests on the stay vane ring 25. The upper end of the intake passage I extends downward from the passage 13 between the piers P, being carried off at an angle thereto, so as to carry the flow around the turbine pit T which is in line with the pier P.

In order to provide a continuous path for the stresses developed in the dam down to the foundation a central pier 65 in the discharge O is made long and large in cross section and the walls 66 between the discharge passages of adjacent units are made narrower. The load from the central piers P carrying the generators and power house will thus be transmitted directly in a vertical plane to the foundation, the discharge pier 65 being in line with the central piers P.

With the spillway passages A thus located between the units the spillway flow is entirely through the spaces between the units. The turbine pits T are continued above the head water level so as to permit the turbine parts to be removed at any time. This open top pit T is also advantageous in avoiding all obstruction to the flow through the spillways A. The pier construction P surrounding the pit T also directly supports the generator and provides a continuous tubular formation of the pit from the top to the bottom resulting in a very strong and rigid construction retaining the turbine parts in accurate alinement. The speed ring 25 rests upon the foundation below and in turn supports the conical casting 24 carrying the turbine head cover. The cylindrical pit liner T rests upon the conical support 24 and extends upward to any desired height to its upper edge 22 which in the specific example shown is arranged at substantially the level of the crest C.

The tubular construction provides a convenient passageway for access to the interior of the pit T so that the bearings and operating parts therein may be easily inspected and kept in adjustment and repair. Whenever it should be necessary to remove the working parts of the turbine they may be withdrawn from above, the rotor of the generator G first being removed.

In the structure of this invention a spillway section A of the dam D is provided within the length of the power house and at the same time provision is made for removing the working parts of the turbine vertically into the power house so that these parts may be handled by the power house crane. When the open air type of generator is adopted the turbine parts can be handled by the Gantry crane which will be supplied to run the length of the generator deck, the same crane being used to handle both the generators and turbines. In regular operation and when the head water level overtops the spillway crest C any excess water may be passed out through the spillway A.

The arrangement of this invention places the various parts of the turbine installation advantageously and compactly. The generator deck is above water level giving clear access to the generators at all heads and providing plenty of surrounding space which would not be the case if the generators were sunken below the spillway level. Immediately below the level of the generators is the spillway passage A running without obstruction between the piers and buttresses on each side. The water inlet I to the turbine surrounds the pit wall 23 and utilizes this outer wall surface as its inner surface so that all the elements of the turbine fit compactly together. Similarly the draft tube F at its lower end is surrounded by the outflow passage O leading the discharge to the tailwater L.

The turbine casing or intake I consists of the curved helical passage carrying the flow to one side and then around the turbine pit in a motion compounded of rotation about the turbine axis and a vertical downward motion. The top 47 of the intake I is formed to approximate a helicoidal surface or a screw thread terminating after rotation of approximately 360°, the lower surface 49 of the intake curving gradually from the horizontal floor 15 of the gate chamber down to the baffle 48. By this design the sudden bend or elbow around which the water would have to flow in turning from the horizontal direction to the vertical direction is avoided and the curvature in the direction of the flow is made much more gradual. The flow enters the speed ring 25 in a natural whirling direction and the velocity and direction of the flow can be closely calculated and determined at all points of the flow between the intake and the entrance to the turbine.

The useful water flow for the turbine after passing through the speed ring 25 and the usual adjustable guide vanes enters between the blades of the runner and is discharged axially downward therefrom. In turbines of high specific speed such as would more usually be employed in such developments involving low heads, this axial flow will also have a considerable whirling motion or rotation of the discharge stream as a whole around the turbine axis. The discharge is received by the spreading draft tube F comprising an upper substantially straight portion of increasing section and expanding radially with continuing increase in cross section so that the flow is turned symmetrically and smoothly into the horizontal direction and has a large part of both its axial and whirling components converted into pressure head at the entrance to the horizontal outlet O which continues with gradual increase in cross section to effect the final conversion of discharge velocity into pressure head at the tail water L.

The helical formation of the intake passage I provides a supporting wall wrapping around the pit wall 23 and, while in the specific embodiment shown in Fig. 1, this passage turns through substantially 360°, it may turn through a greater or less angle and have a correspondingly smaller or larger pitch or be otherwise modified. To reduce the angle and increase the pitch reduces somewhat the amount of concrete and form work required in the construction but at a sacrifice of smoothness of curvature at the entrance to the casing. The choice of the angle would depend upon the economic relation between cost and efficiency in each particular installation.

This application is a division of my copending application, Serial No. 384,402, filed May 26, 1920, now Patent No. 1,722,438, issued July 30, 1929.

I claim:

1. In a hydraulic turbine installation the combination with a dam, of a series of turbine units therein, vertical pits for said units, discharge passages leading from said units, and spillway passages each disposed entirely between successive units, said discharge and spillway passages having overlying portions.

2. In a hydraulic turbine installation the combination with a dam having a generator floor or deck having generators thereon, of circular pit walls extending downward from said floor or deck, turbine units in the pits formed by said walls and accessible therethrough, turbine intake passages surrounding said walls and leading to the turbine units, and spillway passages through said dam between said pits.

3. In a dam the combination with a power house of circular walls extending downward therefrom and forming intake and discharge passages, turbine units within said walls, and spillway passages through said dam between said units, certain of said passages having portions overlying one another, whereby the distance between successive units may be reduced.

4. In a hydraulic turbine installation the combination with an inflow passage for the flow to the turbine runner, of a spillway leading from said inflow passage, an intake passage for a turbine leading from said inflow passage below said spillway, a turbine runner offset from the center line of said spillway, and means driven by said runner above the level of said spillway.

5. In a hydraulic turbine installation the combination with an inflow passage for the flow to the turbine runner, of a spillway leading from said inflow passage, an intake passage for a turbine leading from said inflow passage below said spillway, a turbine runner offset from the center line of said spillway, means driven by said runner above the level of said spillway, and means for independently controlling the flow through said spillway.

6. In a hydraulic turbine installation the combination with a turbine runner, of means providing a head water supply and intake passage therefor, a pit, formed by a wall having a generally cylindrical outer surface, above said runner and containing the shaft and operating mechanism of a turbine, said intake passage surrounding the wall of said pit and in contact therewith, and a spillway passage offset to one side of said pit.

7. In a hydraulic turbine installation the combination with a turbine runner, of means providing a head water supply and intake passage therefor, a pit formed by a wall above said runner, said intake passage passing around said pit wall on the way to said runner, and a spillway passage leading from said head water and offset to one side of said pit.

8. In a hydraulic turbine installation the combination with a runner for a turbine, of a pit above said runner, means providing a head water supply for said runner offset to one side thereof, and an intake passage from said head water to said runner and extending around said pit.

9. In a hydraulic turbine installation the combination with a runner for a turbine, of a pit above said runner, means providing a head water supply for said runner offset to one side thereof, an intake passage from said head water to said runner and extending around said pit and a spillway offset to one side of the center line of said pit.

10. In a hydraulic turbine installation the combination with a turbine runner, of a pit thereabove having a generally cylindrical pit wall, a turbine intake casing surrounding said pit wall and having its inner surfaces formed thereby, and a spillway offset to one side of the center line of said pit.

11. In a hydraulic turbine installation the combination with a turbine runner, of a pit thereabove having a generally cylindrical pit wall, a spiral helical turbine intake casing surrounding said pit wall and having its inner surfaces formed thereby, and a spillway offset to one side of the center line of said pit.

12. In a hydraulic turbine installation the combination with a turbine runner, of a pit thereabove and extending upwardly to provide for the removal of said runner, an intake passage located around said pit, a spillway to one side of the center line of said pit, and a discharge passage extending downwardly from said runner and comprising a spreading portion and a horizontal outlet extending therefrom.

13. In a dam the combination with a series of piers having inlet passages between them, of a spillway and an intake passage leading from each of said inlet passages, said intake having an entrance portion leading from the inlet at a point below the surface level of water flowing through said spillway, means for independently controlling the flows through said inlet passages and said spillway passages, and turbine units in said intake passages offset laterally with relation to said spillway passages.

14. In a dam the combination with a series of piers having inlet passages between them, of a spillway and an intake passage leading from each of said inlet passages, the crest of said spillway lying above the entrance of said intake, means for independently controlling the flows through said inlet passages and said spillway passages and turbine units in said intake passages offset laterally with relation to said spillway passages so as to provide a clear vertical opening to said units between said spillway passages.

15. In a hydraulic turbine installation the combination with a dam wall, of a circular pit therein, a turbine below said pit, a discharge passage leading from said turbine and a spillway passage offset to one side of said pit, and having a portion disposed in a vertical plane which passes through said discharge passage.

16. In a hydraulic turbine installation the combination with a dam wall, of a circular pit therein, a turbine at the bottom of said pit, a spillway passage offset to one side of said pit, an intake passage for said turbine having an entrance portion disposed below the level of the water flowing through the spillway, and means for independently controlling the flow through said turbine and said spillway passage.

17. In a hydraulic power installation a powerhouse substructure forming a dam and containing a series of turbines having vertical shafts, electrical generators above said substructure and connected to said shafts, turbine water passages passing through said substructure and discharging below the surface of tailwater, and spillway passages overlying only a portion of said turbine water passage and disposed above the elevation of the turbines and located between successive turbine units so that the centers of the spillway passages are offset to one side of the turbine axis.

18. In a hydraulic power installation a powerhouse substructure forming a dam and containing a series of turbines having vertical shafts, electrical generators above said substructure and supported thereby and connected to said shafts, turbine water passages passing through said substructure and discharging below the surface of tailwater, the entrance of said turbine water passages being disposed below the level of the water flowing through the spillway, and said spillway passages being below the elevation of the generators and above the elevation of the turbines and located between successive turbine units so that the centers of the spillway passages are offset to one side of the turbine axis.

19. In a hydraulic power installation a powerhouse substructure forming a dam and containing within said substructure a series of turbines having vertical shafts, electrical generators above said substructure and supported thereby and connected to said shafts, turbine water passages passing through said substructure and discharging below the surface of tailwater, and spillway or free discharge passages having portions overlying portions of the turbine water passages, said spillway passages being separate from said turbine water passages and extending through said substructure below the elevation of the generators and above the elevation of the turbines and located between successive turbine units so that the centers of the spillway passages are offset to one side of the turbine axis.

20. In a hydraulic turbine installation, the combination with a turbine, of intake and discharge passages for said turbine, and a spillway passage laterally offset from but so disposed relative to said discharge passage that only a portion of one overlies a portion of the other.

21. In a hydraulic turbine installation, the combination with a turbine, of intake and discharge passages for said turbine, and a spillway passage laterally offset from but so disposed relative to said discharge passage that only a portion of one overlies a portion of the other, and said turbine being disposed between the crest of the spillway and said discharge passage, whereby at least a portion of said intake passage is lower than the spillway and above the discharge.

22. In a hydraulic turbine installation having a turbine unit, an intake passage for said turbine and a spillway passage laterally offset from but so disposed with respect to said intake passage that one has only a portion overlying a portion of the other, and the axis of said turbine being disposed outside of said spillway.

23. In a hydraulic turbine installation, the combination with a dam having a series of turbines associated therewith and intake passages leading to said turbines, of spillway and discharge passages associated with said dam and turbines, and said spillway and discharge passages being laterally offset from, but so disposed relative to, each other as to have overlying portions, whereby a relatively large spillway area is provided for a given length of dam and given number of turbine units.

24. In a hydraulic turbine installation, the combination with a dam, of means forming a substantially circular pit therein, a turbine disposed below said pit, an intake passage surrounding said pit and leading from the upstream face of said dam to said turbine, and a spillway passage laterally offset to one side of said pit.

25. In a hydraulic turbine installation, the combination with a dam having a plurality of turbines associated therewith, and means for conducting fluid to said turbines, of a spillway passage laterally offset from said turbines so as to be between adjacent turbines and discharge passages for each of said adjacent turbines so disposed that said spillway passage overlies at least a portion of each discharge passage.

LEWIS FERRY MOODY.